US008145775B2

(12) United States Patent
Kemp

(10) Patent No.: US 8,145,775 B2
(45) Date of Patent: Mar. 27, 2012

(54) METHOD TO RECEIVE UDP RESPONSE MESSAGES ACROSS MULTIPLE INCOMING UDP PORTS

(75) Inventor: Devon Kemp, Laguna Hills, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 447 days.

(21) Appl. No.: 11/745,997

(22) Filed: May 8, 2007

(65) Prior Publication Data

US 2008/0281976 A1 Nov. 13, 2008

(51) Int. Cl.
*G06F 15/16* (2006.01)
*G06F 15/173* (2006.01)
*H04L 12/28* (2006.01)

(52) U.S. Cl. ........ 709/230; 709/238; 709/245; 709/250; 370/395.52

(58) Field of Classification Search .................. 709/230, 709/238, 245, 250; 370/395.52
See application file for complete search history.

(56) References Cited

U.S. PATENT DOCUMENTS 6,310,877 B1 * 10/2001 Rochberger ............... 370/395.2
2003/0093563 A1 * 5/2003 Young et al. .................. 709/245
2005/0237434 A1 * 10/2005 Takatori et al. ............... 348/725
2006/0104295 A1 * 5/2006 Worley et al. ................. 370/401
2007/0153812 A1 * 7/2007 Kemp ........................... 370/401
2008/0082409 A1 * 4/2008 Huynh ............................ 705/14

* cited by examiner

*Primary Examiner* — Ranodhi Serrao
*Assistant Examiner* — Farrukh Hussain
(74) *Attorney, Agent, or Firm* — Canon USA Inc IP Division

(57) ABSTRACT

An apparatus includes a plurality of UDP ports capable of receiving UDP messages and a message generator to generate a request message to be transmitted to remote endpoints connected over a network via a connectionless diagram protocol. The request message includes a header section having data identifying a plurality of reply-to addresses corresponding to the UDP ports.

3 Claims, 6 Drawing Sheets

```
<S:Envelope xmlns:S="http://www.w3.org/2003/05/soap-envelope"
        xmlns:wsa="http://schemas.xmlsoap.org/ws/2004/08/addressing">
        <S:Header>
              { <wsa:ReplyTo>
        600   { <wsa:Address>http://business456.example/client1/</wsa:Address>
              { </wsa:ReplyTo>
                <wsa:Action>http://fabrikam123.example/mail/Delete</wsa:Action>
        </S:Header>
        <S:Body>
                <f123:Delete>
                        maxCount>42</maxCount>
                </f123:Delete>
        </S:Body>
</S:Envelope>
```

An example of an XML document that includes <ReplyTo> element indicating that response messages are to be sent to a particular URL.

FIG. 6
(PRIOR ART)

METHOD TO RECEIVE UDP RESPONSE MESSAGES ACROSS MULTIPLE INCOMING UDP PORTS

BACKGROUND OF THE INVENTION

1. Field of the Invention

The present invention generally relates to systems and methods for requesting and receiving response messages from a number of remote endpoints connected over a network, and more particularly relates to features of UDP messages.

2. Description of the Related Art

WS-addressing is a specification that is applied to Extensible Markup Languages ("XMLs") (such as Simple Object Access Protocol ("SOAP")) and defines an XML schema that indicates certain Message Information headers. Among other information, these headers provide source and destination headers that indicate where the message came from, where it is going, and where to reply back to.

User Datagram Protocol ("UDP") is a connectionless datagram protocol that may be used to broadcast/multicast messages over a network. The delivery of UDP messages to target recipients may be characterized as a "best-effort" in a sense that the messages are not guaranteed to be delivered and can be lost before reaching their target destination endpoints. Also, UDP does not provide a means to verify that a message has properly reached its target destination endpoint.

FIGS. 5A and 5B illustrate a conventional network system for exchanging messages between a number of devices connected over a network. In FIG. 5A, a UDP request message is broadcasted/multicasted from a requesting device 500 to multiple endpoints 550 (such as those endpoints listening to a multicast address or a well-known IP broadcast address). In response to the request message, each of the endpoints 550-1 through 550-N (also referred to herein as "responding devices") generates and transmits a response message to the requesting device 500, as shown in FIG. 5B. In the system illustrated in FIGS. 5A and 5B, the response messages from the responding devices 550-1 through 550-N are all directed to the same UDP port 510 on the requesting device 500. Consequently, the UDP port 510 of the requesting device 500 will potentially receive one response message from each of the responding devices 550-1 through 550-N that has received the request message. Predicting the number of response messages that will be return to the requesting device is difficult if not impossible. In operation, response messages from the responding devices 550-1 through 550-N are queued into the buffer 512 of the UDP port 510 on the requesting device 500. If the buffer 512 is not large enough to queue all the response messages, then the buffer 512 will become overloaded and some of the response messages will be dropped, resulting in some response messages being lost forever. In such a situation, neither the responding devices nor the requesting device may be aware of the response messages being lost.

SUMMARY OF THE INVENTION

According to an aspect of the present invention, an embodiment is directed to a method and a corresponding apparatus for generating a message including data identifying a plurality of reply-to addresses, and transmitting the message to a plurality of remote endpoints connected over a network via a connectionless datagram protocol.

According to another aspect of the present invention, an embodiment is directed to a system including a first apparatus and a second apparatus connected to a plurality of remote endpoints over a network. Each of the first apparatus and the second apparatus has at least one UDP port capable of receiving UDP messages. The first apparatus generates a message including data identifying a plurality of reply-to addresses corresponding to the UDP ports of the first apparatus and the second apparatus and transmits the request messages to plurality of remote endpoints connected over the network.

Further features and aspect of the present invention will become apparent from the following detailed description of exemplary embodiments with reference to the attached drawings.

BRIEF DESCRIPTION OF THE DRAWINGS

Exemplary embodiments of the present invention are described below with reference to the drawings.

FIG. 6 shows an example of an XML document that includes <ReplyTo> element indicating that response messages are to be sent to a particular Uniform Resource Locator (URL) according to a conventional WS-Addressing specification.

DESCRIPTION OF THE EMBODIMENTS

In the following description, specific details are set forth in order to provide a thorough understanding of embodiments of the present invention. However, it will be apparent to one skilled in the art that embodiments of the present invention may be practiced without these specific details. In other instances, well-known components, structures and techniques have not been shown in detail in order to avoid obscuring the present invention. It is noted that the references to "an" or "one" embodiment of this disclosure are not necessarily directed to the same embodiment, and such references mean at least one.

Figure 1A:
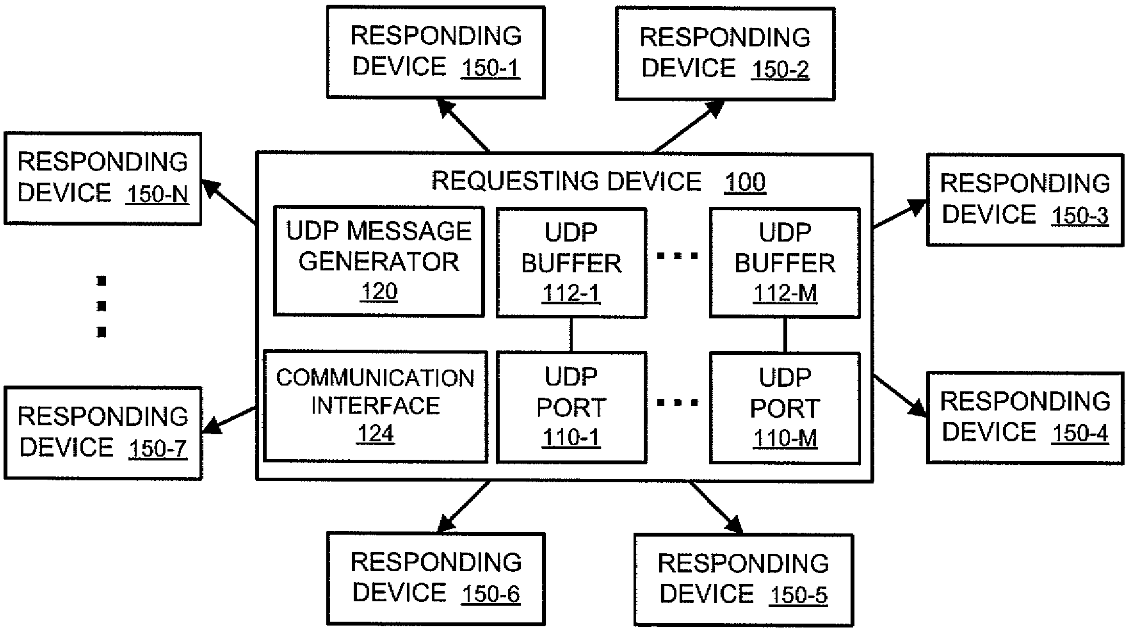
FIG. 1A is a block diagram of a requesting device sending a request message to a number of responding devices according to an embodiment of the present invention.
Figure 1B:
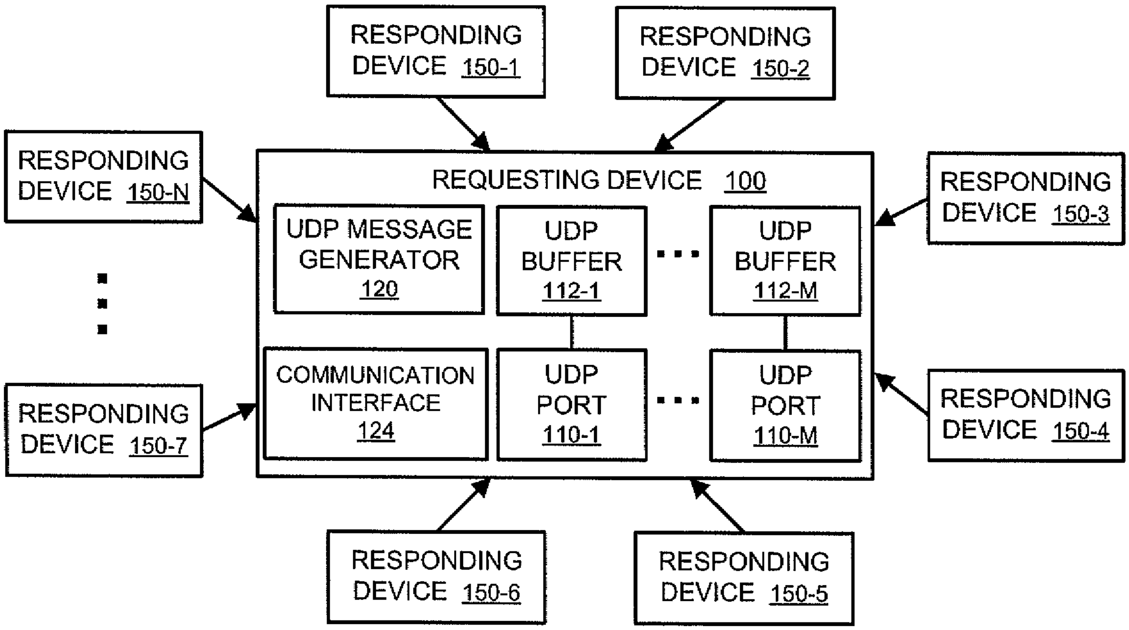
FIG. 1B is a block diagram of response message being sent to the requesting device according to an embodiment of the present invention.

Referring initially to FIGS. 1A and 1B, a system is illustrated for handling messages (e.g., datagrams) between devices connected over a network according to an embodiment of the present invention. FIG. 1A shows a requesting device 100 sending a message to a number of endpoint devices 150-1 through 150-N (also referred to herein as "responding devices") via a connectionless datagram protocol (e.g., UDP). More specifically, in an embodiment, the requesting device 100 sends a request message containing a request for a response via a broadcast/multicast address to the endpoint devices 150-1 through 150-N. In response to the request message, each of the endpoint devices 150-1 through 150-N generates and transmits a response message to the requesting device 100, as shown in FIG. 1B.

Figure 5A:
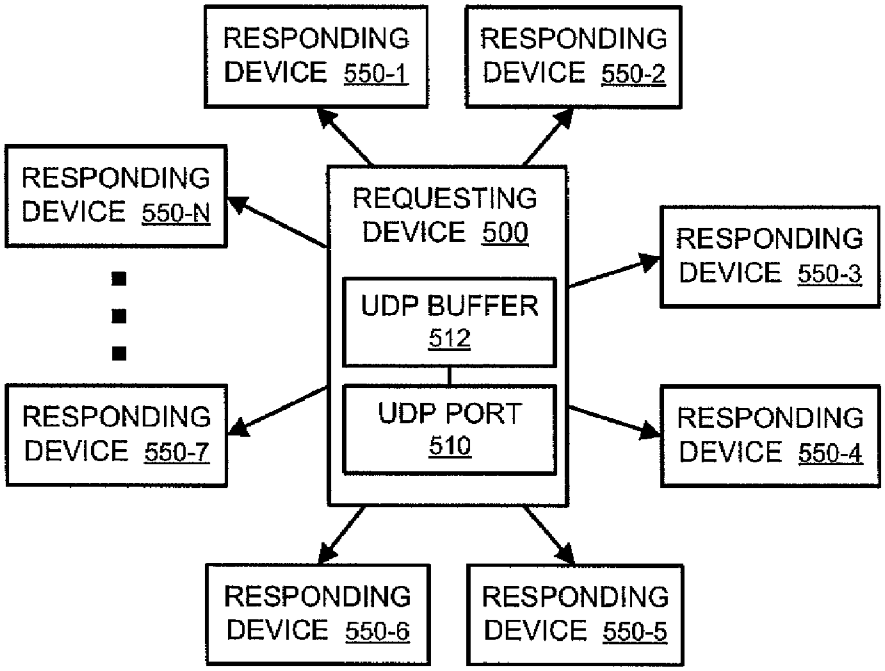
FIG. 5A is a block diagram of a requesting device sending a request message to a number of responding devices according to a conventional system.
Figure 5B:
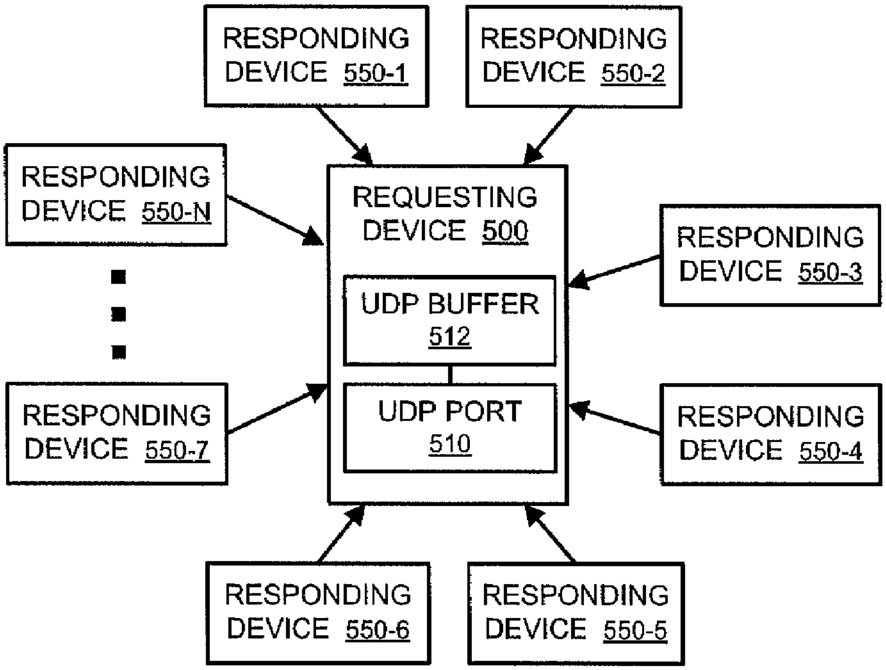
FIG. 5B is a block diagram of response message being sent to the requesting device according to a conventional system.

In contrast to the conventional system illustrated with reference to FIGS. 5A and 5B, the UDP response messages from the responding devices 150-1 through 150-N are not directed to the same single UDP port on the requesting device 100. As shown, the requesting device 100 includes a number of ports (e.g., UDP ports) 110-1 through 110-M capable of receiving incoming messages (e.g., UDP response messages). In accordance with an embodiment, the requesting device 100 utilizes multiple incoming ports 110-1 through 110-M to spread the "same type" response messages across multiple ports. The spreading the same type response message across multiple ports is useful in situations where a request message is expected to generate a large number of response messages, so many, in fact, that a single UDP port will not be able to handle them all and some response messages would be dropped as a result of the single UDP port being overloaded.

Also included in the requesting device 100 are a message generator 120 and a communication interface 124 to transmit messages generated by the message generator to the plurality of responding devices 150. More specifically, in an embodiment, when the requesting device 100 wants to make a query, it constructs a query data and passes the query data to the UDP message generator 120 (e.g. UDP socket), which adds a header section to the query data and passes the resulting UDP message to the communication interface 124 (e.g., network layer). The communication interface 124 encapsulates the UDP message into a datagram and sends the datagram to each destination endpoint (e.g., responding devices 150). According to an embodiment, the header section added by the UDP message generator 120 contains a plurality of reply-to addresses corresponding to the plurality of UDP ports 110-1 through 110-M of the requesting device 110. The header section and the UDP message formats will be described in more detail with reference to FIGS. 3B and 3C.

In XML messaging (e.g., SOAP messaging), there exists an element named <ReplyTo> that is defined by the WS-Addressing specification. FIG. 6 shows an example of an XML document that includes <ReplyTo> element 600 indicating where to send the response message according to an existing WS-Addressing specification. However, according to the existing WS-Addressing specification, maximum of one reply-to address can be associated with <ReplyTo> element 600 for each request message. As a result, according to the existing WS-Addressing specification, each request message can only specify one reply-to address, which means that all of the response messages will go to the same address indicated in the <ReplyTo> Element.

In accordance with an embodiment, the <ReplyTo> schema of the WS-Addressing specification is extended to enable multiple reply-to addresses to be listed within the <ReplyTo> element.

In accordance with an embodiment, the requesting device 100 and the responding devices 150-1 through 150-N will have an understanding that each responding device can send their response messages to "any" of reply-to addresses listed in the request message transmitted by the requesting device 100, and that each "reply to addresses" would be considered equivalent. In an embodiment, when each of the responding devices 150-1 through 150-N receives a request message, each respective responding device is configured to randomly choose which of the reply-to-addresses to respond to. This would have the effect of "spreading out" the high concentration of UDP messages across multiple UDP ports 110-1 through 110-M of the requesting device 100. In an embodiment, the requesting device 100 is capable of determining how many incoming ports to open up based on the size of each UDP buffer 112-1 through 112-M. For requesting devices that have small UDP buffers per port, they can create many incoming ports, and vice-a-versa. Also this can be measured dynamically at runtime, and if the requesting device 100 determines that it is dropping incoming UDP packets, it can decide to open additional incoming ports.

By creating multiple incoming ports 110-1 through 110-M, the requesting device 100 is capable of receiving a very large number of response messages even on a network with a large number of listening endpoint devices (e.g. 200+ endpoint devices). This feature overcomes or at least mitigates problems associated with UDP being a non-guaranteed delivery protocol and each UDP port having a limited UDP buffer size. More specifically, multiple incoming ports 110-1 through 110-M provided in the requesting device 100 serve to reduce the chance of UDP response messages being dropped due to UDP buffer being overloaded.

Figure 2:
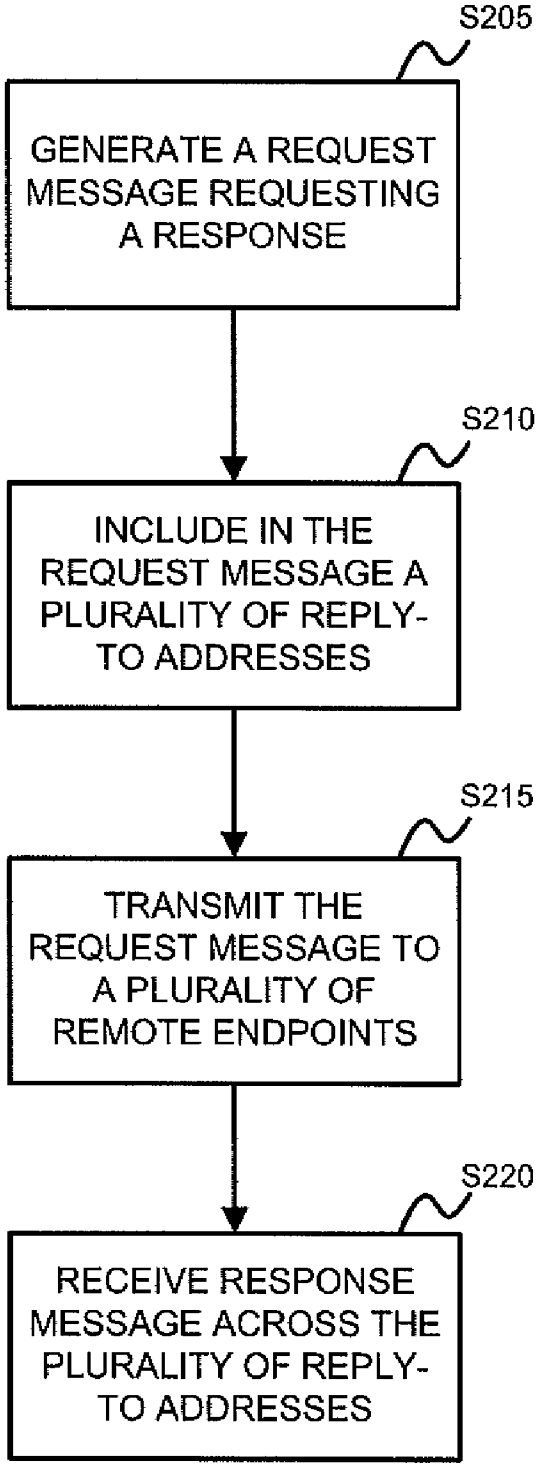
FIG. 2 is a flowchart diagram illustrating operations involved in handling messages between devices according to an embodiment of the present invention.

FIG. 2 shows operations involved in handling messages between devices according to an embodiment of the present invention. In step S205, a requesting device generates a request message containing a request for a response from each of recipient devices. In step S210, the requesting device includes, in a header section of the request message, a plurality of reply-to addresses corresponding to a plurality of incoming ports designated for receiving response messages. In step S215, the requesting device transmits the request message to a plurality of remote endpoint devices connected over a network. In an embodiment, the request message is broadcasted or multicasted from the requesting device to the endpoint devices.

When the request message arrives at each of the endpoint devices (e.g., responding devices 150-1 through 150-N shown in FIG. 1), each of the endpoint devices will use the information contained in the header section of the request message to select one of the reply-to addresses for sending a response message. The selection of one of the reply-to addresses can be accomplished in a number of different ways. For example, in an embodiment, a responding device may be configured to randomly select (e.g., using random number generator) one of the reply-to addresses listed in the header section of the request message and transmit a response message to the randomly selected reply-to address. As a result of each responding device individually selecting one of the reply-to addresses and transmitting a response message to the selected reply-to addresses, the response messages from the responding messages will be received across the plurality of incoming ports of the requesting device in step S220.

Figure 3A:
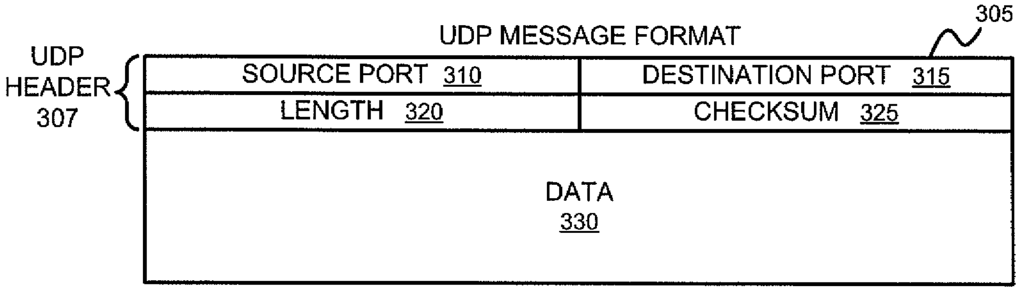
FIG. 3A is a diagram illustrating a conventional UDP message format.
Figure 3B:
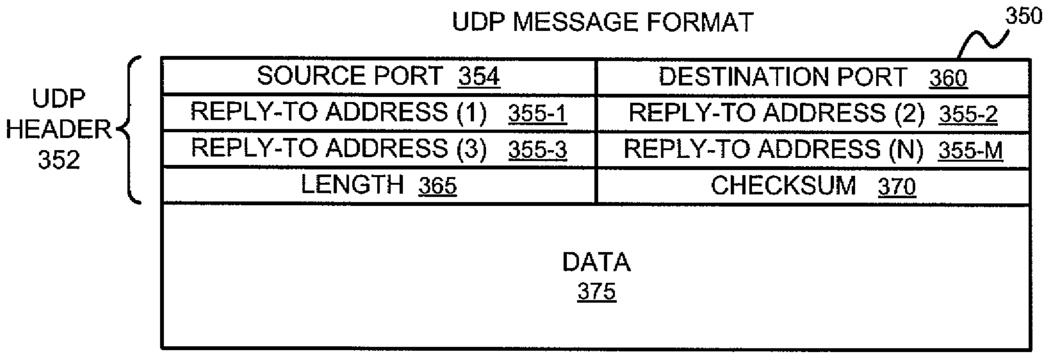
FIG. 3B is a diagram illustrating a first UDP message format according to an embodiment of the present invention.
Figure 3C:
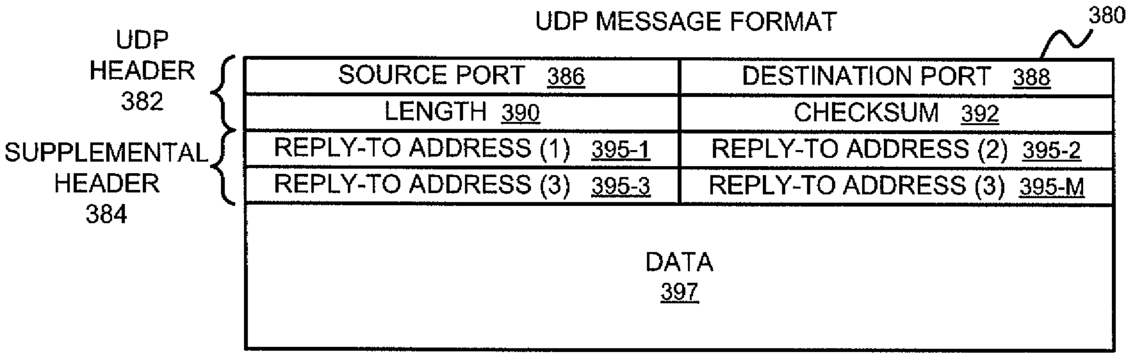
FIG. 3C is a diagram illustrating a second UDP message format according to another embodiment of the present invention.

FIGS. 3A through 3C illustrate how a conventional UDP message format may be modified to accommodate a number of reply-to address information. Firstly, FIG. 3A shows a conventional UDP message format 305, in which the UDP header section 307 is divided into source port field 310, destination port field 315, length field 320 and checksum field 325 to identify the source port that is sending the message, the destination port of the message, the message length and a checksum value, respectively. The source port identified in the source port field 310 may be assumed to be the reply-to address, i.e., the port to which a response message is to be sent. The destination port field 315 may contain multicast group destination address.

FIG. 3B shows a first UDP message format 350 according to an embodiment of the present invention, in which the header section is extended to include additional reply-to address information. As shown in FIG. 3B, the UDP header section 352 is extended to include a plurality of reply-to addresses 355-1 through 355-M. Each of the reply-to addresses 355 included in a UDP message corresponds to each respective incoming UDP port designated to receive response messages.

FIG. 3C shows a second UDP message format 380 according to another embodiment of the present invention, in which a supplemental header 384 is attached between the UDP header 382 and the data payload 397. As shown in FIG. 3C, the supplemental header section 384 includes a plurality of reply-to addresses 395-1 through 395-N.

Figure 4A:
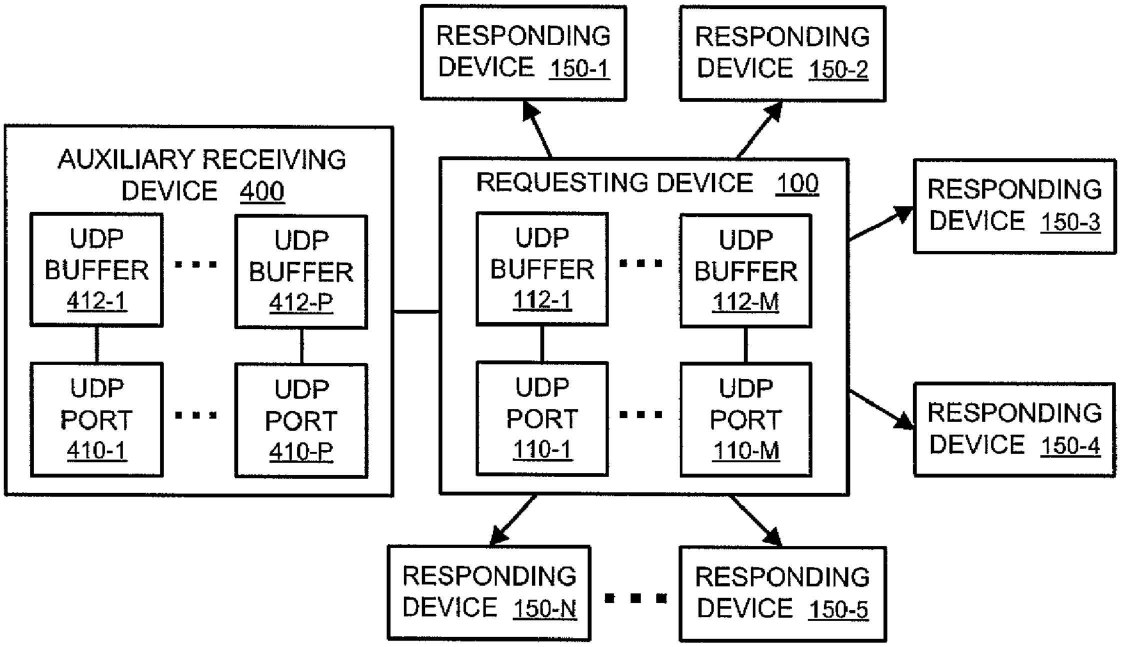
FIG. 4A is a block diagram of a requesting device sending a request message to a number of responding devices according to another embodiment of the present invention.
Figure 4B:
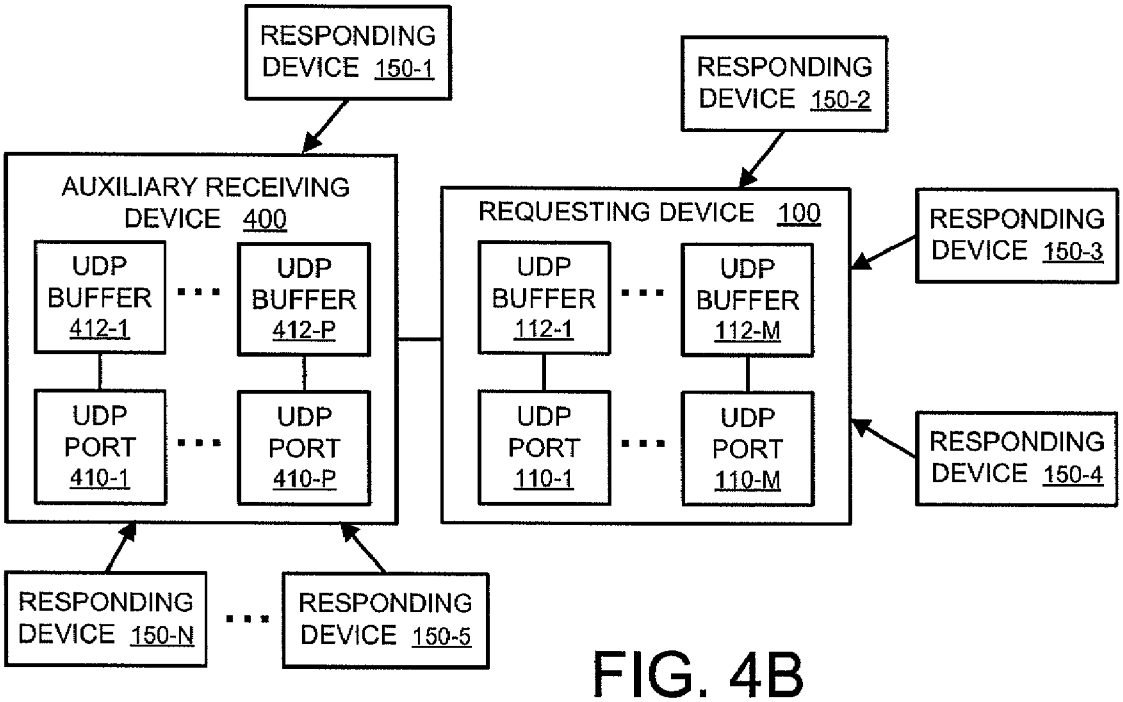
FIG. 4B is a block diagram of response message being sent to the requesting device and an auxiliary receiving device according to another embodiment of the present invention.

FIGS. 4A and 4B show a system for handling messages between devices connected over a network according to another embodiment of the present invention. The network system shown in FIGS. 4A and 4B further includes an auxiliary receiving device 400 that is capable of receiving response messages for the requesting device 100. According to this embodiment, the response messages from the responding devices 150-1 through 150-N are spread across multiple devices (e.g., requesting device 100 and the auxiliary receiving device 400). In operation, the requesting device 100 generates a request message including data identifying a plurality of reply-to addresses, in which at least one of the reply-to addresses corresponds to an incoming port of the requesting device 100 and at least one of the reply-to addresses corresponds to an incoming port of the auxiliary receiving device 400.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A network communication system using extended user datagram protocol (UDP) messages comprising:

a requesting apparatus comprising:

M numbers of UDP ports configured to receive UDP response messages;

UDP buffers configured to temporarily store the UDP response messages received by the M numbers of UDP ports, wherein each of the UDP buffers corresponds to each of the M numbers of UDP ports and, in a case where a specific UDP port of the M numbers of UDP ports receives the UDP response message, the UDP buffer corresponding to the specific UDP port stores the UDP response message temporarily;

a generator configured to generate a UDP message, wherein the UDP message has a UDP header section, expanded by adding a first reply-to address corresponding to a first UDP port and a second reply-to address corresponding to a second UDP port to a UDP header section of the norm, including a source port field, a destination port field, a length field and a checksum field for specifying a reply-to address, wherein the requesting apparatus is equipped with the first UDP port and the second UDP port; and a transmitting unit configured to transmit the UDP message to a plurality of connected devices on a network, using a user datagram protocol (UDP), the user datagram protocol not requiring any connection, and a responding apparatus comprising:

a selecting unit configured to randomly select one reply-to address from among the first reply-to address and the second reply-to address, written in a UDP message transmitted by the transmitting unit when responding to the UDP message transmitted by the transmitting unit; and a responding unit configured to return a response message corresponding to the UDP message to the first UDP port in a case where the first reply-to address is selected by the selecting unit and to the second UDP port in a case where the second reply-to address is selected by the selecting unit.

2. The network communication system of claim 1, wherein the requesting apparatus is further connected to an auxiliary receiving device including P UDP ports, and wherein in the generator, P reply-to addresses, corresponding to P UDP ports included in the auxiliary receiving device, other than the first reply-to address corresponding to the first UDP port and the second reply-to address corresponding to the second UDP port, are added to the UDP header section of the norm, and the header section of the UDP message is expanded.

3. A method for controlling a network communication system using extended user datagram protocol (UDP) messages comprising:

a requesting apparatus comprising:

configuring M number of UDP ports to receive UDP response messages;

configuring UDP buffers to temporarily store the UDP response messages received by the M number of UDP ports, wherein each of the UDP buffers corresponds to each of the M numbers of UDP ports and, in a case where a specific UDP port of the M numbers of UDP ports receives the UDP response message, the UDP buffer corresponding to the specific UDP port stores the UDP response message temporarily;

generating a UDP message, wherein the UDP message has a UDP header section, expanded by adding a first reply-to address corresponding to a first UDP port and a second reply-to address corresponding to a second UDP port to a UDP header section of the norm, including a source port field, a destination port field, a length field and a checksum field for specifying a reply-to address, wherein the requesting apparatus is equipped with the first UDP port and the second UDP port; and transmitting the UDP message to a plurality of connected devices on a network, using a user datagram protocol (UDP), the user datagram protocol not requiring any connection, and a responding apparatus comprising:

randomly selecting one reply-to address from among the first reply-to address and the second reply-to address, written in a UDP message transmitted when responding to the UDP message transmitted; and configuring to return a response message corresponding to the UDP message to the first UDP port in a case where the first reply-to address is selected and to the second UDP port in a case where the second reply-to address is selected.

* * * * *